Aug. 27, 1963

R. H. McCULLOUGH 3,101,643

MOSAIC MOTION PICTURE PROJECTION APPARATUS

Filed Aug. 26, 1954

INVENTOR.
RUSSELL H. McCULLOUGH
BY
*Kenyon & Kenyon*
ATTORNEYS

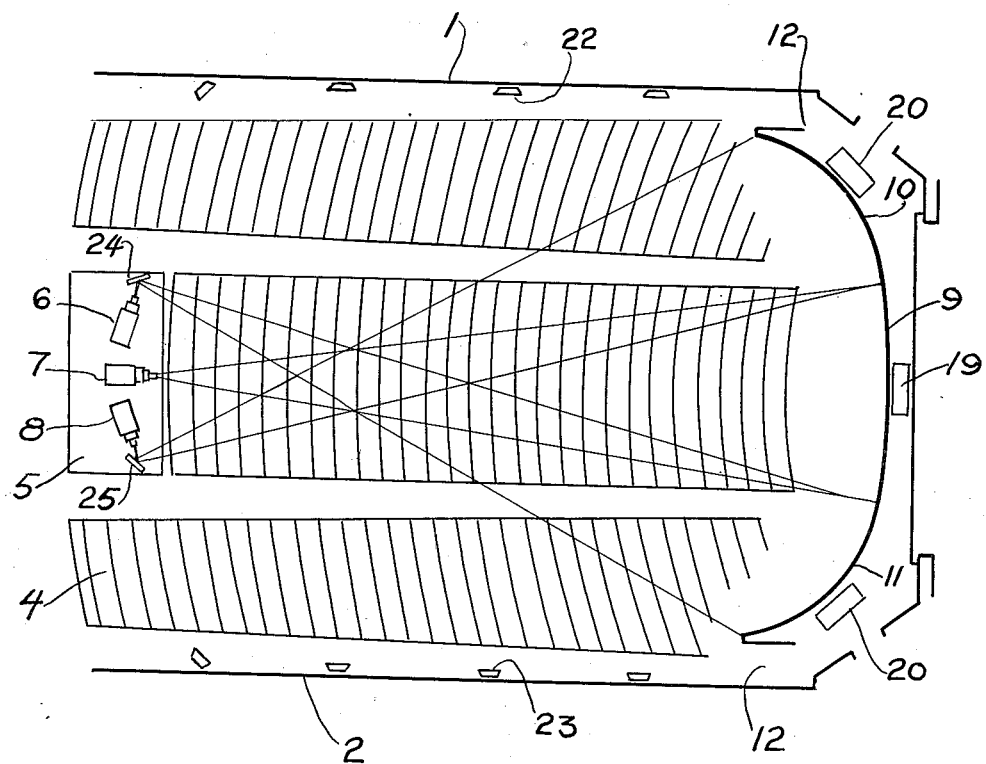

United States Patent Office 3,101,643
Patented Aug. 27, 1963

3,101,643
MOSAIC MOTION PICTURE PROJECTION
APPARATUS
Russell H. McCullough, Los Angeles, Calif., assignor, by mesne assignments, to Cinemiracle Internation Picture Inc., a corporation of Delaware
Filed Aug. 26, 1954, Ser. No. 452,323
4 Claims. (Cl. 88—16.6)

This invention relates to motion picture projection apparatus of the type wherein a plurality of projectors simultaneously project onto a horizontally-elongated screen which is spaced from the projectors so as to define a spectator area between the projectors and the screen. The screen has a central portion which is substantially at a right angle to the spectator area, and end portions that angle diagonally towards the area. Usually, these end portions are concave. The projectors are provided with films taken simultaneously so that when the images projected on the screen from the projectors are placed side by side, a panorama view results.

With this type of apparatus and by using stereophonic sound reproduction through the use of appropriately-positioned loud speakers controlled by appropriate sound tracks recorded during the photographing of the films, extremely impressive spectator reactions are obtainable.

In theatres of conventional design intended for the exhibition of motion pictures on a flat screen of standard design, the width of the auditorium is in most instances relatively narrow with respect to the theatre length. The motion-picture projector is normally positioned in a booth at the rear center of the theatre, whereby the entire space extending between the screen and the projector is available as a viewing or spectator area. Where, however, a panoramic screen having a semi-elliptical configuration is installed in the same theatre, such that the concave end portions of the screen extend somewhat along the side walls of the theatre to create peripheral vision effects, it was heretofore not possible to make use of the full length of the theatre as a spectator area; nor was it feasible to group the several projectors within a common booth at the rear of the theatre.

The reasons for these limitations arise from the fact that in order to cast moving-picture images without distortion onto the concave end portions of the screen, it became necessary to place the related projectors adjacent the side walls of the theatre at points well below the rear. At these side positions, the optical systems of the projectors are axially alignable with the concave end portions of the screen, such alignment obviously not being obtainable at the rear of the theatre. Consequently, that section of the theatre extending behind the side projectors was no longer available as a spectator area, with a resultant loss in spectator revenue. While it was possible to place the projector for the flat center portion of the screen in a booth at the rear center of the theatre, the required side placements for the remaining projectors precluded the grouped installation of these projectors in the same booth.

Moreover, since the relatively close placement of the side projectors with respect to the curved end portions of the screen entails the use of short-focus projector lens systems affording a relatively small depth of focus, the fact that the screen end portions were curved rather than flat created serious optical problems. It became essential, therefore, to incorporate in the side projectors a lens system specially ground and corrected to produce uniformly-focused images on the curved screen surface. This requirement further augmented the expense of the installation.

It is known in the science of optics that the amount by which the distance between the exit pupil of a lens and the plane occupied by the screen can be changed without causing the diameter of the "circle of confusion" to exceed an acceptable value characterizes the depth of focus of the lens. The "circle of confusion" is the term applied to the circular blurred image of a point-object formed by a lens at a position displaced from the focal point of the lens.

Thus, the fact that every point on the curved end portion of the screen does not lie precisely in the focal plane of the lens system is not material where the displaced points fall within the depth of focus of the system. In the event a lens of long focal length is utilized in a projector at an extended distance from the screen, the relatively great depth of focus of the optical system is such that the image on the curved screen surface will appear uniformly in focus without the need for special lens-correction expedients.

Accordingly, it is the principal object of the invention to provide a moving-picture projection arrangement for a panoramic-screen theatre installation wherein the optical distance between the end portions of the screen and the related projectors is extended, preferably to exceed the length of the theatre, said projectors incorporating a long-focus optical system whose depth of focus produces a substantially uniformly-focused image on said end portions. A feature of the invention resides in the use of reflecting means to extend the optical path between the curved portions of the screen and the related projectors to make possible the incorporation of a long-focus optical system in said projectors.

One of the objects of the present invention is to provide apparatus of the type described and which has the advantages that all of the projectors may be positioned at any desired distances from the screen and, if desired, may be compactly grouped together at the rear of a relatively deep and narrow spectator area. Attainment of this object automatically permits the use of long-focus lenses providing a relatively deep field of focus at the screen, whereby to provide sharpness on the concave screen portions. However, another object is to provide the described type of apparatus in a form providing for substantially perfect focus sharpness on the concave screen portions without requiring the use of specially ground projection lenses. In other words, the object of the present invention is to provide for the described kind of panoramic image projection from a plurality of appropriately photographed films by using standard motion-picture projectors arranged completely at the rear of an ordinary motion-picture theatre and so as to obtain a uniformly sharply-focused panorama display, without requiring the use of specially-ground projection lenses.

A specific example of apparatus embodying the invention is illustrated by the accompanying drawings in which:

FIG. 4 is a plan view of the inside of a theater incorporating another embodiment of the invention.

Referring to these drawings, a moving picture theater of typical dimensions and proportions is shown by the side walls 1 and 2 in the end walls 3 and 4 which outline the portion used to exhibit the pictures. The end wall 3 defines the front while the end wall 4 defines the back, respecting this portion.

Figure 1:
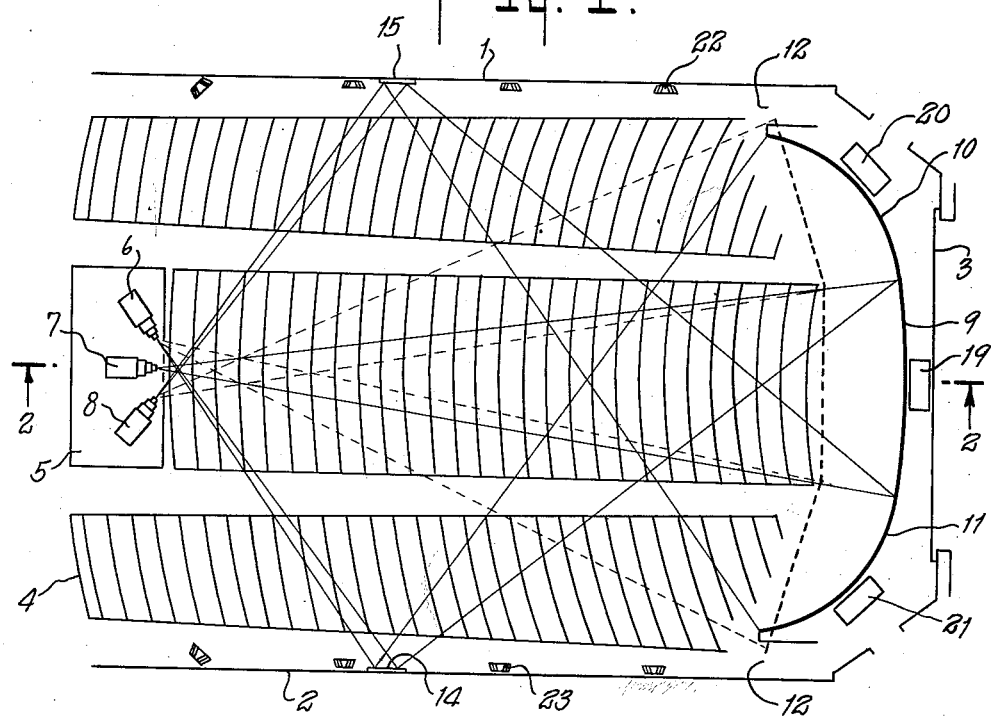
FIG. 1 is a plan view of the inside of a motion picture theater incorporating a preferred embodiment of the invention.
Figure 2:
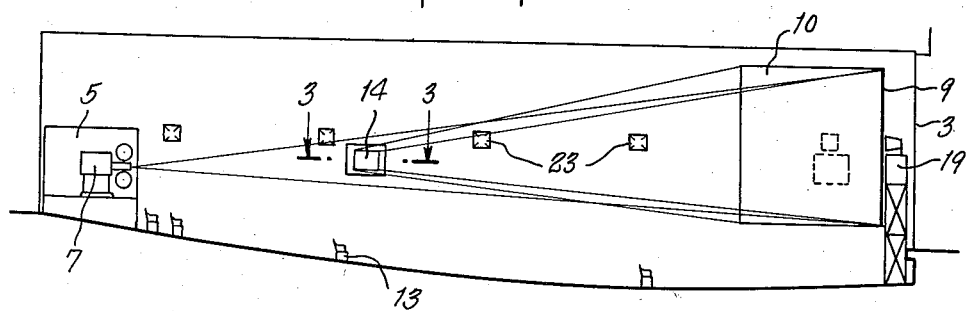
FIG. 2 is an elevational view or longitudinal cross-section taken on the line 2—2 in FIG. 1.

A projection booth 5 at the back 4 houses three motion picture projectors 6, 7 and 8 which are relatively closely spaced together so as to form a group of projectors. At the front 3 the screen is located with the three portions, a central substantially flat portion 9 and the two concave end portions 10 and 11, respectively. The three portions constitute a continuous, seamless screen which is horizontally elongated to fill substantially the full width between the walls 1 and 2 excepting for the necessary exits 12. As shown by FIG. 1, a horizontal cross-section through the screen provides a shape that is one-half of what is substantially an oval. The space between the group of projectors and the screen defines the area for the spectators, this area being shown filled with theater seats 13 which all face towards the screen.

The screen portions 10 and 11, in effect, diagonally slant towards the walls or sides of the spectator area, while the screen portion 9 faces directly towards the rear wall 4. The projector group and the screen are substantially symmetrically disposed relative to the longitudinal center line of the spectator area.

The central projector 7 is oriented or aimed directly at a right angle to the central screen portion 9. The longest possible focus projection lens may be used by this projector 7 and since the portion 9 is substantially flat the image projected on it is substantially sharp throughout its area, even though the portion 9 may have some slight curvature as shown.

The projector 6 is for the screen portion 10 and both this projector and this screen portion are oppositely oriented diagonally so as to point towards or face the side wall 2. A suitable reflector 14 of good optical properties is mounted on the side wall 2 at a position where it reflects the image from the projector 6 directly to the screen portion 10 and substantially at right angles thereto. Thus there is a straight throw of the projected image to the screen 10 while the projector 6 remains at the back of the theater with the projector 7 which latter projection is operating more or less in the standard manner. The projector 6 may have a long focus projection lens with the attendant advantages already described. The screen portion 10 has a greater curvature than the screen portion 9 but the throw from the projector 6 to the reflector 14 and from there to the screen portion 10 is greater, so the focal length of the projection lens for the projector 6 is even greater than in the case of the projector 7. This provides a correspondingly greater depth of focus on the screen portion 10. The projector 8 and the screen portion 11 are also provided with a reflector 15, on the wall 1, so as to provide the same action and effect described in connection with the projector 6 and screen portion 10, excepting that the angularities are opposite.

Now it can be appreciated that the projection booth 5 may be made almost as compact as a standard projection booth, because the three projectors 6, 7 and 8 may be arranged very closely together as is shown. The projection booth is located at the rear of the active exhibition area so that all of the theater seats ordinarily provided remain available for effective use. The need for exhibiting the panorama type of motion picture in a theater having the proportions of a so-called legitimate theater, is eliminated. The apparatus disclosed may be used in a moving picture theater of the dimensions and contour such as has become conventional, and there is no need for sacrificing about half of the customary spectator space.

Figure 3:
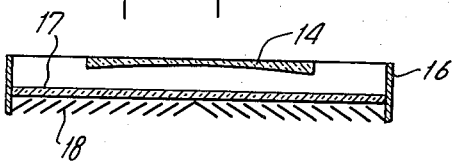
FIG. 3 is a horizontal cross-sectional of a feature shown in FIG. 2 and taken on the line 3—3 in this FIG. 2.

As shown by FIG. 3 the reflectors 14 and 15 may in each instance be enclosed by a box 16 having a front wall 17 made of glass having good optical properties, and which may be coated to reduce reflections. This box may be filled with helium or other inert gas so as to protect the reflector 14 in case the latter comprises a surface coated mirror. Such a mirror has the advantage that it reflects but a single image. Such a mirror may be amply protected in some instances without filling the box with inert gas. A plurality of louvers 18 may be positioned in front of the glass wall 17 with these louvers positioned to pass the image from the projector to the mirror and from the latter to the screen, while visually shielding the spectators, in the spectator area, from the reflector. This reduces or prevents visual distraction of the spectators resulting from the mirrors or reflectors 14 and 15.

When exact sharpness throughout the relatively sharply curved screen portions 10 and 11 is desired, the reflectors or mirrors 14 and 15 may be made with slightly concave surfaces which are optically calculated to focus the image reflected thereby to a focal plane coinciding with the concave screen to which the image is reflected, in each instance. Slight inaccuracies in such optically calculated surfaces have a reduced effect due to the long focal length of the lenses which may be and necessarily are used in the case of the projectors 6 and 8. In the case of each screen the image is projected with a straight throw at right angles to the screen, while all of the projectors are closely grouped together completely at the rear of the spectator area where the projectors are out of the way and inconspicuous.

It is to be understood that the three films projected by the three projectors are taken simultaneously by appropriately positioned moving picture cameras having lenses of appropriate focal lengths and with everything controlled so that the desired panorama effect is obtained when the films are projected. Each film may be photographed with an accompanying sound track obtained from three appropriately positioned microphones, with the proper sound track fed to the appropriate one of the loud speakers or sound horns 19, 20 and 21 shown behind the screens 9, 10 and 11, respectively. For special sound effects a fourth track may be recorded so as to provide for activating side loud speakers or horns 22 and 23 arranged in series arrangements along the walls 1 and 2, respectively, as required to provide realistic sound for accompanying the projected picture. The sound units 19, 20 and 21, of course, provide for stereophonic sound.

During the photographing of the three films the three moving picture cameras used must ordinarily be interlocked for simultaneous operation. This also applies to any sound tracks recorded. During the projection the three projectors must also be interlocked for simultaneous operation. Such interlocking is greatly facilitated by the close curving of the three projectors permitted by the present invention. In all instances any suitable interlocking may be used.

Referring now to FIG. 4, there is shown an arrangement in which the reflectors for the side projectors are mounted on opposing walls of the projection booth, rather than on the side walls of the theatre, as in FIG. 1. This arrangement is of particular advantage in theatres having a balcony and where, because of the vertical dimensions of the projected light, it is not feasible to place the projection booth under the balcony at the rear of the lower-floor seating area. It must be borne in mind that with panoramic presentations of the type described herein, the ray of projected light is vertically about one and a half times higher than the conventional 35-millimeter projection. With the reflectors mounted within the projection booth, in the manner shown in FIG. 4, the booth may be positioned at balcony level so that the projected rays are free of obstruction.

In FIG. 4, those elements in the installation which correspond to elements in FIG. 1 are identified by like reference numerals. The projection booth 5 is provided with a central projector 7, aimed directly at the central screen portion 9. A long-focus projection lens system may be used in projector 7; and since screen portion 9 is substantially flat, the image projected thereon is substantially sharp throughout its area—even though the screen portion 9 may have a slight curvature. Also included in the booth 5 is a reflector 24 mounted adjacent one side wall of the booth and facing curved screen portion 11, and a reflector 25 mounted adjacent the opposing side wall of the booth and facing curved screen portion 25.

Side projector 6 is oriented to project an image onto reflector 24, the image being directed by reflector 24 onto curved screen portion 11. Side projector 8 is oriented to project an image onto a reflector 25, the image being directed by reflector 25 onto curved screen portion 10.

It will be noted that the central projector 7 casts its image directly onto the screen, whereas the images thrown by side projectors 6 and 8 are in intersecting paths whose optical distances from projector to screen exceed that of the central projector. Consequently, it becomes possible to use in the side projectors 6 and 8 lens systems having a long-focus characteristic greater than that in the central projector 7 and providing a relatively deep field of focus. With such long-focus lens systems incorporated in the side projectors, sharp images are produced on the screen portions 10 and 11, despite their concavity.

Thus, in the arrangement illustrated in FIG. 4, the three projectors are grouped together in a common projection booth, the booth further including reflectors operating in conjunction with the side projectors to extend the optical path between the curved portions of the screen and the related projectors, thereby making possible the use of long-focus optical systems to produce sharp and clear images on the curved screen portions.

While there has been shown what at present are considered to be preferred embodiments of the invention, it will be apparent that many changes and modifications may be made therein without departing from the essential spirit of the invention. It is intended, therefore, in the annexed claims to cover all such changes and modifications as fall within the true scope of the invention.

I claim:

1. In a theatre installation provided with a projection booth adjacent the rear of the theatre and a panoramic screen adjacent the front of the theatre and having a central portion and curved end portions, apparatus for projecting a composite image onto said screen derived from three separate films each containing one component of the composite image, said apparatus comprising a group of three projectors disposed in said booth, said projectors carrying the respective films and being symmetrically arranged with respect to said screen, the center projector casting an image component directly onto the central portion of said screen, and reflectors disposed cooperatively with respect to the side projectors to cast the image components therefrom along intersecting paths onto the respective end portions of said screen, whereby the optical distance between each of said end portions and the related side projector exceeds that between the central portion of the screen and the center projector, said side projectors having long focus lens systems producing a relatively great depth of focus, thereby avoiding image distortion on said curved side portions of said screen.

2. In a theatre installation provided with a projection booth adjacent the rear of the theatre and a panoramic screen adjacent the front of the theatre and having a center portion and curved end portions, apparatus for projecting a composite image on said screen derived from three separate films each containing one component of the composite image comprising a first projector oriented to cast an image in a central path directly onto the center portion of said screen, second and third projectors disposed on either side of said first projector, the projectors all being disposed in said booth, and reflectors disposed in cooperative relation to said second and third projectors with respect to said curved end portions of the screen to cast image components thereon in intersecting paths, whereby the optical distance between each of said end portions and the associated projector exceeds that between said center portion and said first projector, said second and third projectors including long focus optical systems providing a relatively great depth of focus.

3. In a theatre installation provided with a projection booth adjacent the rear of the theatre and a panoramic screen adjacent the front of the theatre, said screen having a central panel and a pair of curved end panels; apparatus for projecting a composite motion picture image on said screen derived from three separate films each containing one component of the composite image, said apparatus comprising a group of three motion picture projectors disposed in said booth and symmetrically arranged with respect to said screen, said three films being contained respectively in said three projectors, the center one of said group of projectors being oriented to cast its image component directly on the central portion of said screen, the side projectors being cross oriented to project their image components toward opposing sides of the theatre, reflectors disposed adjacent the opposing sides of the theatre cooperatively with respect to said side projectors to cast the image components therefrom along intersecting paths onto the respective end panels of said screen whereby the optical distance between each of said end panels and the related side projector exceeds that between the central panel of the screen and the center projector, said side projectors having long focus lens systems producing a relatively great depth of focus thereby avoiding image distortion on said curved side portions of said screen.

4. In a theatre installation provided with a projection booth adjacent the rear of the theatre and a panoramic screen adjacent the front of the theatre, said screen having a central panel and a pair of curved end panels; apparatus for projecting a composite motion picture image on said screen derived from three separate films each containing one component of the composite image, said apparatus comprising a group of three motion picture projectors disposed in said booth and symmetrically arranged with respect to said screen, said three films being carried respectively in said three projectors, the center one of said group of projectors being oriented to cast its image component directly on the central panel of said screen, the side projectors being oriented to project their image components toward opposing sides of the booth, reflectors mounted adjacent the opposing sides of the booth cooperatively with respect to said side projectors to cast the image components therefrom along intersecting paths onto the respective end panels of said screen whereby the optical distance between each of said end panels and the related side projector exceeds that between the central panel of the screen and the center projector, said side projectors having long focus lens systems producing a relatively great depth of focus thereby avoiding image distortion on said curved side portions of said screen.

References Cited in the file of this patent

UNITED STATES PATENTS

| | | |
|---|---|---|
| 1,489,988 | Dickinson | Aug. 8, 1924 |
| 1,666,304 | Proctor | Apr. 17, 1928 |
| 1,957,745 | Wildhaber | May 8, 1934 |
| 2,280,206 | Waller et al. | Apr. 21, 1942 |
| 2,388,203 | Zindel | Oct. 30, 1945 |

FOREIGN PATENTS

| | | |
|---|---|---|
| 385,423 | France | Mar. 16, 1908 |
| 563,486 | France | Sept. 26, 1923 |
| 657,324 | France | Jan. 15, 1929 |